Sept. 1, 1970     K. R. RAMAN     3,526,054
PREFABRICATED WALL CONSTRUCTION WITH ELECTRICAL
POWER SUPPLY AND APPLIANCE INSTALLATIONS
Filed Nov. 1, 1966
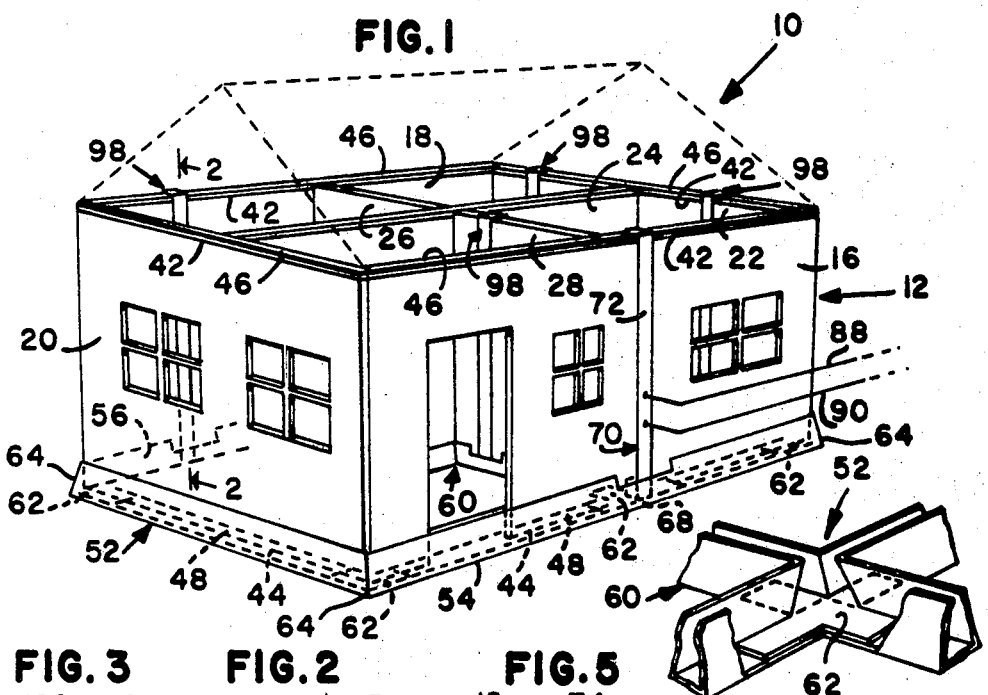
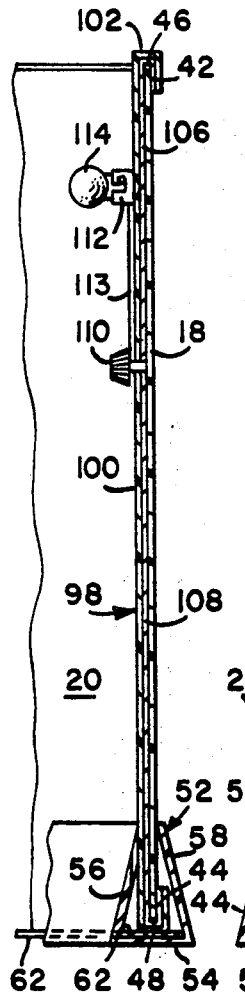
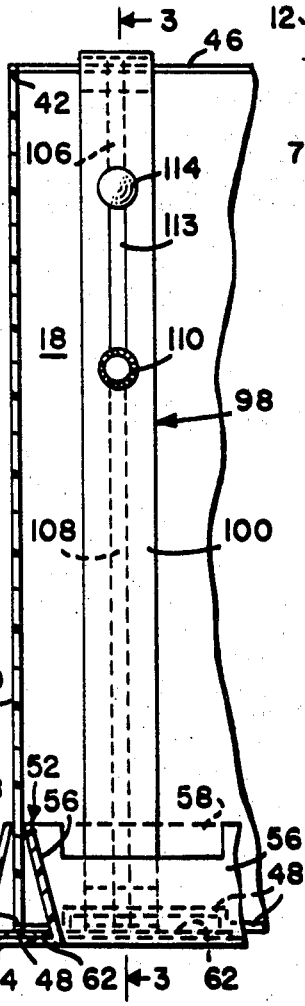
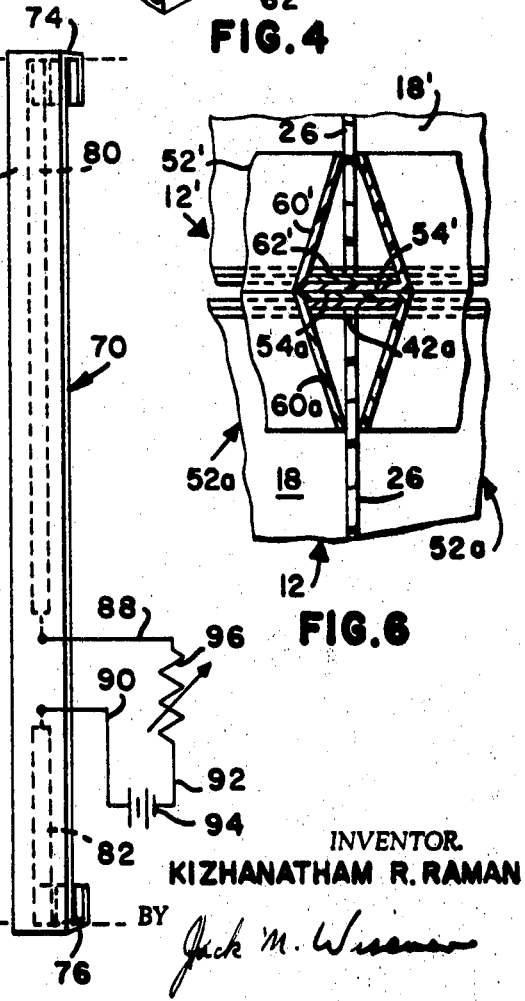
INVENTOR.
KIZHANATHAM R. RAMAN
BY *Jack M. Wissner*
ATTORNEY

United States Patent Office 3,526,054
Patented Sept. 1, 1970

3,526,054
PREFABRICATED WALL CONSTRUCTION WITH ELECTRICAL POWER SUPPLY AND APPLIANCE INSTALLATIONS
Kizhanatham R. Raman, 834 Sutter Ave., Palo Alto, Calif. 94303
Filed Nov. 1, 1966, Ser. No. 591,224
Int. Cl. A63h 33/10
U.S. Cl. 46—21                                11 Claims

ABSTRACT OF THE DISCLOSURE

A prefabricated wall construction with electrical installations including a plurality of separable walls adapted to be supported erect and in abutting relationship, said walls including electrical conductor strip means along the upper edge and the lower edge, electric power supply means interconnecting the upper and lower edge strip means and an electric appliance fixture means disposed along a surface of one of said walls in electrical engagement with said upper and lower strip means for establishing an electrical operating circuit therebetween.

---

The present invention relates to wall constructions, and more particularly to a wall construction with electrical installations.

An object of the present invention is to provide an improved electrical installation for a wall construction.

Another object of the present invention is to provide an electrical installation for a wall construction which is formed of relatively inexpensive materials.

Still another object of the present invention is to provide an electrical installation for a wall construction which is formed of prefabricated wall elements.

A further object of the present invention is to provide an improved playhouse equipped with electrical installations.

Another object of the present invention is to provide an appliance fixture for a playhouse that is displaceable.

Other and further objects and advantages of the present invention will become apparent to one skilled in the art from the following description taken in conjunction with the accompanying drawings, in which:

FIG. 1 is a diagrammatic perspective view of a playhouse constructed in accordance with the present invention.

FIG. 2 is a fragmentary vertical cross-sectional view taken through one of the walls of the playhouse of FIG. 1 and along line 2—2 thereof.

FIG. 3 is a vertical cross-sectional view taken along the lines 3—3 of FIG. 2.

FIG. 4 is a fragmentary perspective view, being partly broken away, of a foundation element of the playhouse of FIG. 1.

FIG. 5 is a diagrammatic perspective view of a power supply unit employed for the playhouse of FIG. 1.

FIG. 6 is a fragmentary vertical cross-sectional view illustrating a modified wall construction in accordance with the invention.

Illustrated in FIG. 1 is a playhouse 10 constructed in accordance with the present invention. The playhouse 10 is formed of a wall construction 12, and may be provided with a conventional roof. The wall construction 12 includes a front wall 16; a rear wall 18; and confronting side walls 20 and 22. A longitudinally extending inner wall 24, and two transversely extending, aligned inner walls 26 and 28 serve to divide the playhouse 10 into four rooms.

Each of the walls 20, 22, 24, 26 and 28 presents an upper edge surface 42 and a lower edge surface 44 (FIGS. 1–3). Imbedded in each of the upper edge surfaces 42 is an electrical conductor strip 46. Imbedded in each of the lower edge surfaces 44 is an electrical conductor strip 48. The conductor strips 46 are in abutting end-to-end relationship for establishing electrical connections to form a continuous upper electrical path.

The wall construction 12 including a foundation 52. The foundation 52 is of trough-like construction, and provides a substantially flat bottom web 54 (FIGS. 1–3) and two inwardly-inclined confronting side webs 56 and 58. The foundation 52 is of generally rectangular outline, and serves to support in an upright position each of the walls 16, 18, 20 and 22. Thus, each of the walls 16, 18, 20 and 22 is removably inserted within the foundation 52 with the respective lower edge surface 44 resting upon the bottom web 54 and with the wall portion adjacent each lower surface 44 being engaged by the side webs 56 and 58. The walls 24, 26 and 28 are similarly supported by the foundation 52. For this purpose, the foundation 52 includes a centrally positioned cross-shaped element 60 (FIG. 4).

Seated within the foundation 52 and in abutment with the bottom web 54 are a plurality of electrical conductor members 62, each being of comparatively thin material. The L-shaped conductor member 62 is provided at each outside corner 64 of the foundation 52. The cross-shaped conductor member 62 (FIG. 4) is located at the center of the foundation element 60. The T-shaped conductor member 62 is located at each of the remaining points of wall intersection, such as is seen at 68. Each of the conductor members 62 lies in contact with each of the two or more conductor strips 48, which meet at the respective point of wall intersections 64, 66 or 68. The conductor members 62 thus serve to electrically interconnect the conductor strips 48 so that 62 and 48 together provide means for the formation of a continuous lower electrical path.

An electric power supply unit 70 (FIGS. 1 and 5) is provided for the wall construction 12 which is displaceable along the wall thereof through a suitable horizontal slot formed in the wall to receive the lower flanged end thereof. The power supply unit 70 includes an elognate attachment member 72, which is of hook shape at its opposite ends 74 and 76. Mounted on the inner surface of the attachment member 72 are two electrical conducting contact strips 80 and 82. The strip 80 extends into the hook-shaped end 74, while the strip 82 extends into the hook-shaped end 76. The strips 80 and 82 are connected at their respective inner ends to two electric lines 88 and 90, respectively. The latter are connected in a circuit 92 with a suitable source of electric power 94, such as, e.g., a battery, or an electric generator. Also connected in the circuit 92 is a variable resistor 96.

The member 72 is mounted on the front wall 16 and is of such length that the hooked ends 74 and 76 engage the upper and lower edge surfaces 42 and 44, respectively, of the wall 16. The strip 80 thus contacts the conductor strip 46, while the strip 82 contacts the conductor strip 48.

A plurality of appliance fixtures, such as four light fixtures 98 (FIGS. 1–3), are provided for lighting the playhouse 10, which are also displaceable along the wall thereof. Each of the light fixtures 98 is similar in structure to the electric power unit 70. Thus, each light fixture 98 is formed of an attachment member 100 with opposite hooked ends 102 and 104. The attachment member 100 is provided with two interior electrical contact strips 106 and 108, which extend from the hooked ends 102 and 104, respectively. A conventional switch 110 is mounted on the member 100 for electrically interconnecting or disconnecting the strips 106 and 108. Also, mounted on each of the members 100 is an electric light socket 112, which has one terminal electrically connected to the strip 106 and the other terminal thereof is connected to the portion of the switch 110 that is connected to the terminal strip 108. For his purpose, a conductor strip 113 interconnects the other terminal of a light bulb 114 with the portion of the switch 110 directly connected to the strip 108. Inserted in each of the sockets 112 is an appliance, such as the conventional electric light bulb 114.

The light fixtures 98 are mounted on the walls 18, 22 and 28, respectively. Thus, the hooked ends 102 and 104 of the attachment member 100 engage the upper and lower edge surfaces 42 and 44 of the associated wall, respectively. Consequently, the conductor strips 106 and 108 are brought into contact with the underlying conductor stirps 46 and 48, respectively.

The playhouse 10 may be constructed of any suitable material. The foundation 52 is of an electric insulator material, and preferably of plastic, while the remainder of the wall construction 12 is preferably of cardboard or plastic material. The attachment member 72 and 100 are preferably of the same material as the foundation 52. The conductor strips 46 and 48 are preferably of copper. The conductor strips 80, 82, and 106, 108 are likewise preferably of copper. The conductor members 62 are preferably of copper foil.

The playhouse 10 presents a number of advantages with respect to the production and the use thereof. The preferred materials of construction employed, such as have been indicated above, are of comparatively low cost. The various structural elements may be prefabricated and may be readily assembled together by hand. The electrical connections are established without soldering or splicing of electrical wires or the like.

With respect to the electrical installation feature of the playhouse 10, each wall surface is equipped for establishing an electrical connection thereto for the energizing of an appliance, such as a light fixture. The electric power unit 70 serves to supply electrical energy to the circuit paths formed by the conductor strips 46 and 48. When the switch 110 of any of the associated light fixtures 98 is moved from the open position shown into a closed position, an energizing circuit for the associated light bulb 114 is produced over the following path: source of power 94, resistor 88, conductor 80, conductor strip 46, conductor 106, light bulb 114, conductor 113, switch 110, conductor 108, conductor strip 48, conductor 82, conductor 90 and back to the source of power 94. Light is thus produced in the associated light bulb 114.

The wall construction 12 of FIGS. 1–5 may be modified for the provision of a multiple-story playhouse. Such modification is illustrated in FIG. 6. In accordance with the modification, a foundation support member 52a is employed, which is identical in structure to the foundation 52 of FIGS. 1–5. However, the support members 52a lies in an inverted position so as to engage each wall (only the walls 18 and 26 being shown) of the wall construction 12 at and adjacent to the respective upper edge surfaces 42. The top web 54a is thus horizontally disposed and rests upon the respective upper edge surfaces 42. Seated on the web 54a is the bottom web 54' of a further foundation 52'. The foundation 52' is part of a second-story wall construction 12', which is identical to the wall construction 12.

The wall construction 12' may be provided with electrical installations in the same manner as already described for the wall construction 12 of FIGS. 1–5.

Having thus described my invention, what I claim as new and desire to protect by Letters Patent is:

1. A wall construction comprising:
   (a) a plurality of separable and unitary walls presenting respective upper edge surfaces and respective lower edge surfaces;
   (b) wall support means for supporting each of said walls in erected position and in mutually abutting relation to adjacent ones of said walls;
   (c) an upper conductor strip means on each of said walls, said strip means including strips arranged to have abutting surfaces when their respective walls are in abutment to form a first electrical path;
   (d) means to form a second electrical path including a lower conductor strip means on each of said walls said upper and lower strip means being insulated from each other;
   (e) electric power supply means including a member detachably securable to one of said walls and electrically interconnecting its upper and lower conductor strip means; and
   (f) an appliance fixture means including a member disposed along a surface of one of said walls interengaging the upper edge surface thereof and the lower edge surface thereof and disposed in engagement with said upper conductor strip means and said lower conductor strip means for establishing an electrical operating circuit therebetween said appliance fixture member having means for detachably securing it to said one wall in adjustable position therealong.

2. A wall construction in accordance with claim 1, in which said wall support means is of trough-like foundation, a portion of each of said walls adjacent the respective lower edge surface being removably inserted within said foundation.

3. A wall construction in accordance with claim 2, in which said foundation provides a substantially flat bottom web and two inwardly inclined opposite side webs, said webs being adapted to engage each inserted wall portion.

4. A wall construction in accordance with claim 3, in which said second conductor strip means includes a plurality of conductor members disposed in abutment with said bottom web.

5. A wall construction in accordance with claim 1, in which said wall support means is a foundation support member of trough-like shape disposed in inverted position for engagement of each of said walls adjacent the respective upper edge surface, said foundation support member providing a substantially flat top web adapted to support the foundation of a further wall construction in a multiple-story arrangement.

6. A wall construction in accordance with claim 1, in which each of said upper and lower conductor strip means are on the upper and lower wall edge surfaces respectively.

7. A wall construction in accordance with claim 6, in which each of said conductor strip means includes conductor members at construction junctions of said wall construction.

8. A wall construction in accordance with claim 1, in which said electric power supply means includes a movable attachment member having an inner surface provided with two electrical contact strips, said attachment member being adapted to engage both the upper and lower edge surfaces of one of said walls, said contact strips being positioned to contact the upper and lower conductor strip means respectively.

9. A wall construction in accordance with claim 6, in which said appliance fixture is constructed for mounting an electrically-powered device, said appliance fixture including a movable attachment member having an inner surface provided with two electrical contact strips, each attachment member being adapted to engage both the upper and lower edge surfaces of one of said walls, the contact strips of each attachment member being positioned to contact the upper and lower conductor strip means on to the upper and lower surfaces of the engaged wall respectively.

10. A wall construction in accordance with claim 1, in which said walls and wall support means are shaped and arranged to provide a playhouse.

11. A prefabricated construction for assembling an enclosure comprising:
   a plurality of separable unitary walls presenting respective upper edge surfaces and respective lower edge surfaces, each of the walls carrying a first conductor strip along the upper edge thereof and a second conductor strip along the lower edge thereof;

wall support means for frictionally engaging and supporting said walls in an erect position and in a mutually abutting relation to adjacent ones of said walls;

said first conductor strips being electrically connected to form a first electrical path, said second conductor strips being electrically connected to form a second electrical path when said walls are in a mutually abutting relation;

electrical power supply means including a member detachably securable to one of said walls and electrically connected through frictional engagement to said first and second conductor strips for supplying electrical power over said first and second electrical paths;

appliance fixture means including a member detachably securable along a surface of one of said walls, said appliance fixture means being in frictional and electrical engagement with said first and second conductor strips for establishing an electrical operating circuit between said appliance fixture means, said first and second conductor strips and said electrical power supply means; and said member for detachably securing said appliance fixture means to said wall includes means for detachably securing said appliance fixture means to said one wall in such a way that the appliance fixture means is movable along said one wall while maintaining mechanical connection therewith and electrical connection with said first and second conductor strips.

References Cited

UNITED STATES PATENTS

| | | | |
|---|---|---|---|
| 635,994 | 10/1899 | Campbell | 46—21 |
| 1,889,468 | 11/1932 | Flannery | 46—12 |
| 2,733,544 | 2/1956 | Bonanno | 46—12 |
| 3,237,341 | 3/1966 | Janning | 46—16 |

FOREIGN PATENTS

| | | |
|---|---|---|
| 123,170 | 2/1919 | Great Britain. |

F. BARRY SHAY, Primary Examiner

U.S. Cl. X.R.

46—226